(12) United States Patent
Kiening et al.

(10) Patent No.: US 9,575,306 B2
(45) Date of Patent: Feb. 21, 2017

(54) STEREOSCOPIC MICROSCOPE (71) Applicant: Arnold & Richter Cine Technik GmbH & Co. Betriebs KG, Munich (DE)

(72) Inventors: Hans Kiening, Lenggries (DE); Manuel Millahn, Munich (DE); Martin Kiening, Bad Tolz (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 254 days.

(21) Appl. No.: 14/265,442

(22) Filed: Apr. 30, 2014

(65) Prior Publication Data
US 2014/0327742 A1 Nov. 6, 2014

(30) Foreign Application Priority Data

May 6, 2013 (DE) .......................... 10 2013 208 306

(51) Int. Cl.
G02B 21/36 (2006.01)
G02B 21/22 (2006.01)
G02B 25/00 (2006.01)

(52) U.S. Cl.
CPC ............. G02B 21/365 (2013.01); G02B 21/22 (2013.01); G02B 25/001 (2013.01)

(58) Field of Classification Search
CPC ...... G02B 21/365; G02B 21/22; G02B 25/001
(Continued)

(56) References Cited

U.S. PATENT DOCUMENTS 4,571,627 A * 2/1986 Stempeck .......... H04N 5/23293
348/333.09
5,067,804 A 11/1991 Kitajima et al.
(Continued)

FOREIGN PATENT DOCUMENTS

DE 42 43 452 A1 6/1994
DE 42 43 556 A1 6/1994
(Continued)

OTHER PUBLICATIONS

Translation of German Search Report dated Oct. 17, 2013 relating to DE 10 2013 208 306.8.

*Primary Examiner* — Thai Tran
*Assistant Examiner* — Nien-Ru Yang
(74) *Attorney, Agent, or Firm* — Dinsmore & Shohl LLP; Douglas W. Sprinkle (57) ABSTRACT

An electronic stereoscopic microscope for detecting and reproducing pairs of stereoscopic part images comprises a camera unit having at least one electronic image sensor, a dog-leg objective for generating an image of an object on the image sensor, wherein the objective comprises a first leg facing the object to be imaged, a second leg facing the image sensor and including an angle with the first leg and deflection means provided between the legs, wherein the first leg extends along an imaging axis and the second leg extends along a detection axis. The microscope furthermore comprises an electronic viewfinder for reproducing stereoscopic part images detected by means of the image sensor, with the electronic viewfinder being arranged in an observation position or being movable into an observation position which is provided at a rear side of the objective in an extension of the imaging axis.

13 Claims, 6 Drawing Sheets

(58) Field of Classification Search
USPC .......................................................... 348/46
See application file for complete search history.

(56) References Cited

U.S. PATENT DOCUMENTS

| | | | |
|---|---|---|---|
| 6,396,627 | B1 | 5/2002 | Tachihara et al. |
| 7,180,660 | B2 | 2/2007 | Hauger et al. |
| 8,115,993 | B2 | 2/2012 | Hauger et al. |
| 8,514,488 | B2 | 8/2013 | Lucke et al. |
| 2002/0080481 | A1 | 6/2002 | Tachihara et al. |
| 2002/0131017 | A1 | 9/2002 | Kishida et al. |
| 2004/0017607 | A1* | 1/2004 | Hauger ............... G02B 21/22 359/376 |
| 2004/0036962 | A1 | 2/2004 | Brunner et al. |
| 2004/0100619 | A1 | 5/2004 | Olivier et al. |
| 2007/0127115 | A1 | 6/2007 | Hauger et al. |
| 2010/0157244 | A1 | 6/2010 | Leblanc |
| 2010/0259815 | A1* | 10/2010 | Nakamura ........... G02B 21/22 359/376 |
| 2011/0211160 | A1* | 9/2011 | Akahane ............. A61B 3/005 351/206 |
| 2012/0050673 | A1 | 3/2012 | Shikaumi |
| 2012/0229605 | A1* | 9/2012 | Pretorius ............. G02B 21/22 348/46 |
| 2014/0009825 | A1 | 1/2014 | Luecke et al. |

FOREIGN PATENT DOCUMENTS

| | | |
|---|---|---|
| DE | 100 27 166 B4 | 12/2000 |
| DE | 103 00 925 A1 | 9/2003 |
| DE | 10 2005 013 570 A1 | 11/2005 |
| DE | 10 2009 037 921 A1 | 3/2011 |
| DE | 10 2011 010 262 A1 | 8/2012 |
| DE | 10 2011 114 583 A1 | 4/2013 |
| JP | 90-070406 | 3/1997 |
| JP | 2007-310160 A | 11/2007 |

* cited by examiner

STEREOSCOPIC MICROSCOPE

CROSS-REFERENCE TO RELATED APPLICATIONS

This application claims priority of German Patent Application DE 102013208306.8 filed May 6, 2013.

FIELD OF THE INVENTION

The present invention relates to a stereoscopic microscope for detecting and reproducing pairs of stereoscopic part images.

Such a stereoscopic microscope is used, for example, in the form of a surgical microscope for surgical procedures in the field of clinical medicine. Stereoscopic microscopes are furthermore also used in the field of biological and medical diagnosis.

BACKGROUND OF THE INVENTION

With conventional stereoscopic surgical microscopes, a magnified representation of an object takes place with the aid of single objectives or objective pairs and a downstream pair of eyepieces through which a person can view the object. These surgical microscopes have the disadvantage that the light intensity available for the observation by the main user is reduced for a branching of image information from the optical path such as is necessary for a parallel observation by a second person or for documentation purposes.

Furthermore, it is often desired with stereoscopic microscopes that the viewfinder or the eyepieces are located as closely as possible to the object to be observed so that it is possible for the user of the microscope to adopt a body posture which is as ergonomic as possible for carrying out manipulations which he would like to carry out at the observed object with the aid of his hands.

SUMMARY OF THE INVENTION

It is therefore the object of the present invention to provide a stereoscopic microscope which allows a high-quality duplication of image information with a compact and ergonomic construction.

The object is satisfied by a stereoscopic microscope having the features of claim 1. An electronic stereoscopic microscope in accordance with the invention for detecting and displaying pairs of stereoscopic part images comprises a camera unit having at least one electronic image sensor, having a dog-leg objective for generating an image of an object on the image sensor, with the objective comprising a first leg facing the object to be imaged, a second leg facing the image sensor and including an angle with the first leg and deflection means provided between the legs, wherein the first leg extends along an imaging axis, the second leg extends along a detection axis and the deflection means deflect an imaging optical path conducted along the imaging axis along the detection axis in the direction of the image sensor, and having radiation splitting means within the objective which are configured to divide the imaging optical path into respective part optical paths, with the part optical paths differing with respect to their observation angles of the object. The microscope in accordance with the invention furthermore comprises an electronic viewfinder for reproducing stereoscopic part images detected by means of the image sensor, with the electronic viewfinder being arranged in an observation position or being movable into an observation position which is provided at a rear side of the objective in an extension of the imaging axis. The electronic viewfinder can be electronically connected to an output of the camera unit to be able to receive and reproduce the stereoscopic part images detected by means of the image sensor. For example, one or more mirrors and/or prisms can be used as deflection means.

The design in accordance with the invention of the microscope allows two stereoscopic part images, which correspond to a left perspective or to a right perspective respectively, to be recorded alternately or also simultaneously. An electronic detection of the stereoscopic part images imaged by means of the object takes place so that the image data or image signals generated by the image sensor or sensors and present in electronic form can be split and/or duplicated as desired. The image data or image signals can thus not only be reproduced with the aid of the electronic viewfinder, but additionally or alternatively also at further reproduction means, for example one or more additional electronic viewfinders, 3D eyeglasses or monitors, and/or can be transferred to a remote transmission system. It is thus possible that a plurality of persons can simultaneously observe the object detected by the imaging system without an attenuation of the light intensity occurring in this respect. A simultaneous recording of the stereoscopic part images for documentation purposes is thus also possible without any quality loss, with both still images and moving images being able to be recorded.

For the observation of the stereoscopic part images detected by means of the image sensor by the user of the microscope (e.g. a surgeon), the electronic viewfinder is provided in an observation position or can at least be selectively moved into an observation position which is provided at a rear side of the objective in an extension of the named imaging axis (that is in an extension of the named first leg of the objective close to the object). Such a coaxial arrangement allows the user to select his direction of gaze such that he looks at the image pair reproducing the imaged object at least approximately in the same direction as he would also look at this object without the taking system. The imaging axis of the objective namely ultimately defines the "direction of gaze" of the camera unit toward the object. Since the electronic viewfinder is located in an extension of the imaging axis, that is in the named "direction of gaze", at least in the named observation position, a particularly ergonomic and intuitive use of the microscope results. If the user would like to perform manipulations with the aid of his hands at the imaged object, he can align his head and his gaze in the direction of the object, which substantially simplifies the coordination of the hand movements with the visual impression generated by the electronic viewfinder.

The dogleg embodiment of the objective shortens its effective construction length in comparison with a stretched construction such that the spacing between the object and the electronic viewfinder is reduced, which has a particularly advantageous effect with the initially explained coaxial alignment of the electronic viewfinder to the object. Only some of the imaging elements of the objective and/or of the beam splitting means namely have to be accommodated in the first leg facing the object. The remainder of these imaging elements, and optionally the image sensor itself, can be accommodated at or in the second leg of the objective which is angled (i.e. inclined by an angle differing from 180°) with respect to the first leg and is thus not relevant for the construction length of the microscope at least in the direction of observation. It is possible for the user to carry out manipulations at the object in an ergonomically favorable body posture due to the shortened effective construction length of the microscope. An unfavorable body posture in which, for example, work has to be carried out with extended arms can thus be avoided.

In accordance with an advantageous embodiment of the invention, the electronic viewfinder is movably connected to the camera unit via an adjustment apparatus which is configured to adjust the position of the electronic viewfinder with respect to the camera unit, with the electronic viewfinder being located in the named observation position, that is at the rear side of the objective in an extension of the imaging axis of the first leg of the objective, at least in a first adjustment position. It is possible with the aid of the adjustment apparatus to bring the electronic viewfinder into at least one second adjustment position differing from the named observation position if the spatial circumstances require it. Both the camera unit can thus therefore be ideally aligned to the object and the electronic viewfinder can be ideally aligned to the user without the latter having to adopt a possibly uncomfortable body posture.

The electronic viewfinder advantageously defines an observation axis, with the electronic viewfinder furthermore being arranged or movable such that the observation axis coincides with the imaging axis. In other words, the observation axis defines the direction of gaze of a user toward the electronic viewfinder which can in particular be predefined by the center axis of the optical axes of the eyepieces. If the observation axis and the imaging axis coincide, the user of the microscope looks, free of parallax, in the same direction at the stereoscopic part image pair in which the camera unit "looks" at the object. The stereoscopic part images presented to the user therefore correspond to that view, with the exception of a change in magnification, which would anyway be presented to him without the microscope. If therefore the electronic viewfinder is located in the first adjustment position and in the named alignment, the microscope does not produce either a change in the angle of gaze or a parallax in comparison with an observation of the object taking place with an unassisted eye.

In accordance with a further advantageous embodiment, the observation axis intersects the imaging axis of the first leg of the objective in at least one second adjustment position of the electronic viewfinder. The adjustment apparatus thus also allows an adjustment of the electronic viewfinder into such adjustment positions which admittedly do not necessarily have ideal angle of view ergonomics, but which do, for example, allow a more comfortable body posture of the user.

In accordance with a possible embodiment of the invention, the adjustment apparatus is configured to displace the electronic viewfinder along a direction of movement parallel to the second leg of the objective or with a movement component in parallel with the second leg of the objective. Such a preferably linear displacement movement thus changes the lateral spacing between the imaging axis and the electronic sensor.

Alternatively or additionally, the adjustment apparatus can be configured to pivot the electronic viewfinder about at least one pivot axis. The pivoting can take place such that the angle between the observation axis of the electronic viewfinder and the imaging axis of the objective, and optionally also the position of the point of intersection of the two named axes, can be changed. The adjustment apparatus can generally be configured such that it allows a combination of a displacement and a pivoting of the electronic viewfinder. It is understood that two or more pivot axes can also be provided which can be aligned in parallel with one another or also rotated with respect to one another.

The named pivot axis advantageously extends perpendicular to a plane which is spanned by the first leg and the second leg of the objective. The electronic viewfinder is thus pivotable within the plane spanned by the first leg and the second leg. A second pivot axis can, for example, additionally be provided such that it extends in parallel with or in the named spanned plane.

The named pivot axis can in particular intersect the imaging axis of the first leg of the objective or the extension of this imaging axis.

The at least one pivot axis is preferably arranged along the length of the first leg of the objective (i.e. in the region of the first leg and not behind it, for instance). A pivoting about a large radius hereby takes place and thus with a relatively large movement component in parallel with the second leg of the objective and with a relatively small movement component in parallel with the first leg of the objective.

Provision can be made that a light outlet region of the electronic viewfinder coincides with or is spaced apart from the pivot axis. The light outlet region can, for example, be defined by the light outlet side of an eyepiece pair of the electronic viewfinder or by an image surface of an electronic display device or of a pair of electronic display devices. In the first-named case, only a change in the angular position occurs on a pivoting of the electronic viewfinder, whereas in the last-named case a horizontal and/or vertical position change of the electronic viewfinder also takes place in dependence on the alignment of the pivot axis.

In accordance with a further advantageous embodiment, the adjustment apparatus is fastened to the camera unit. The adjustment apparatus can in particular be fastened to the objective (preferably to the second leg of the objective). In other words, in this embodiment, the electronic viewfinder is mounted movably via the adjustment apparatus at the objective of the camera unit. A particularly compact construction shape of the microscope results from this.

Alternatively, the adjustment apparatus can also, for example, be arranged at a stand, with the stand being able to be either a separate tripod which is only provided for the electronic viewfinder or a common stand which also carries the camera unit.

Alternatively to the use of the named adjustment apparatus, provision can also be made that the electronic viewfinder is rigidly fastened to the camera unit.

The angle included between the first and second legs advantageously amounts to 90°. In this manner, an objective of particularly compact design can be realized without any special design measures being required to avoid any geometrical distortions.

In accordance with a further advantageous embodiment of the invention, the second leg of the objective is aligned such that the detection axis extend perpendicular to a plane which is spanned by the optical axes of the two part optical paths extending within the first leg. The second leg, for example, faces vertically upward when the plane spanned by the two part optical paths extends horizontally, i.e. when the objective "looks" in a horizontal, non-tilted direction. It is thereby ensured that the second leg impairs the movement range for the user of the microscope as little as possible.

The objective advantageously has a single imaging optical path with a central optical axis, with the camera unit furthermore only comprising one single electronic image sensor which preferably has an electronic shutter for setting a charge integration time of the image sensor. In this embodiment, the beam splitting means comprise: a double aperture diaphragm which is arranged in the imaging optical path and which has two mutually spaced apart apertures which are offset with respect to the optical axis and which divide the imaging optical path into the respective part optical paths; a rotating shutter which is associated with the double aperture diaphragm, which releases one of the two apertures for a predefined time period alternatingly in time in accordance with a speed of rotation and which closes the other one of the two apertures at least during this time period in order to release alternatingly in time one of the two part optical paths and to interrupt the other one of the two part optical paths; and a synchronization and control device which is adapted to synchronize the reading out of the image sensor (in particular the charge integration time set by the electronic shutter of the image sensor) and the rotational speed of the rotating shutter with one another such that the image sensor detects a respective stereoscopic part image on the basis of the released part optical path during the named time period.

The named charge integration time is understood as the starting point in time and the duration or the end point in time of the charge integration in the light-sensitive pixels (picture elements) of the image sensor. The image sensor typically comprises a two-dimensional matrix of pixels in which electrical charge is generated in dependence on an exposure (e.g. intensity, duration and wavelength of the radiation application) and a corresponding electrical signal is generated. The image frequency or image rate of a series of images detected by the image sensor results from the named charge integration time, e.g. from the difference of the starting points in time of two images taken after one another.

The rotational speed of the rotating shutter can in particular be detected via a suitable pulse generator, e.g. a Hall sensor. It is understood that the exposure time of the image sensors can also additionally be controlled with the aid of the electronic shutter (that is the duration of the exposure). In general, however, the rotating shutter can also contribute to controlling the exposure time. The rotating shutter can be a so-called sector shutter which has one or more segment openings.

In general, however, beam splitting can also take place in any other desired manner. For instance, prisms and/or partly permeable mirrors can, for example, be provided as beam splitting means. Furthermore, electronic shutters (e.g. a respective LCD shutter) can also be provided for the two part optical paths.

Instead of an objective with a single imaging optical path and beam splitting means, a double objective having two imaging optical paths and to sensors can also be provided.

The electronic viewfinder preferably has at least one electronic display device and two eyepieces. The electronic viewfinder is thus similar to an optical viewfinder used in conventional microscopes.

For example, the electronic viewfinder can have a single electronic display device for displaying the detected stereoscopic part images, with the electronic viewfinder furthermore comprising a beam splitting device which directs the stereoscopic part images detected in accordance with the one optical path to the one eyepiece and the stereoscopic part images detected in accordance with the other part optical path to the other eyepiece.

Alternatively, the electronic viewfinder can have two electronic display devices for displaying the detected stereoscopic part images, with an eyepiece being associated with each electronic display device and with the one display device being provided for the reproduction of the stereoscopic part images detected in accordance with the one optical path and the other display device being provided for the reproduction of the stereoscopic part images detected in accordance with the other part optical path.

Further advantageous embodiments of the invention are set forth in the dependent claims, in the description and in the drawings.

The invention will be described in the following with reference to an embodiment and to the drawings.

DETAILED DESCRIPTION OF THE PREFERRED EMBODIMENTS

Figures 1, 1A:
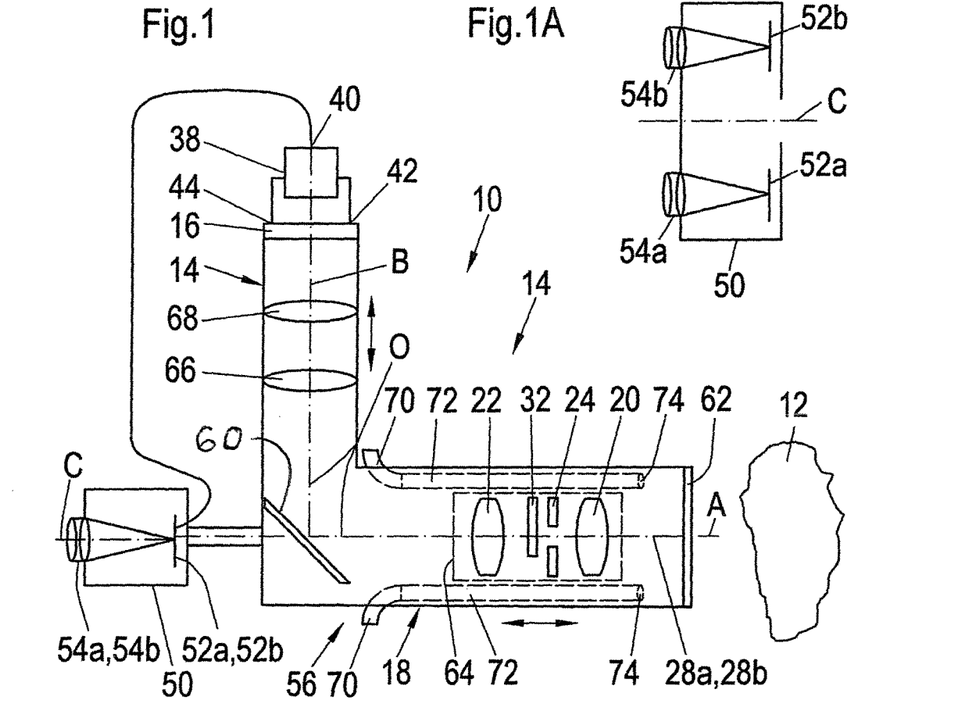
FIG. 1 shows a schematic side view of a stereoscopic microscope in accordance with the invention in accordance with an embodiment.
FIG. 1A shows an electronic viewfinder of the stereoscopic microscope in accordance with FIG. 1 in a plan view.

A stereoscopic microscope 10 in accordance with the invention for detecting and reproducing pairs of stereoscopic part images of an object 12 comprises a camera unit 14 which has an electronic image sensor 16, for example a CMOS sensor, and an L-shaped objective 18 for generating an image of the object 12 on the image sensor 16. The objective 18 has a first leg 18a facing the object 12 to be imaged and a second leg 18b facing the image sensor 16. The second leg 18b includes a right angle with the first leg 18a. Optical components, in particular lenses, are provided both in the first leg 18a and in the second leg 18b of the objective 18, as will be explained in the following.

The leg 18a is closed in the direction of the object 12 by a transparent sealing window 62 which is formed, for example, by a planoparallel glass plate and serves as protection against contamination. Starting from the sealing window 62, there follow as optical elements along a central optical axis O a front lens or first lens 20 and a rear lens or second lens 22 which together with an associated carrier (not shown) form a lens group 64.

The lens group 64 forms a single imaging optical path whose beams extend in parallel between the first lens 20 and the second lens 22. The lens group 64 can be moved as a unit along a part section of the optical axis O extending in the region of the first leg 18a and called an imaging axis A in order to vary the factor of magnification of the objective 18 (zoom function). It is understood that more complex multilens objectives having a fixed or a variable focal length can also be used. Furthermore, special embodiments of objectives can be used which have anti-aliasing properties due to the glass types used, due to their aperture and/or to their optical path so that an optical low pass filter at the image sensor can be dispensed with.

Figure 2:
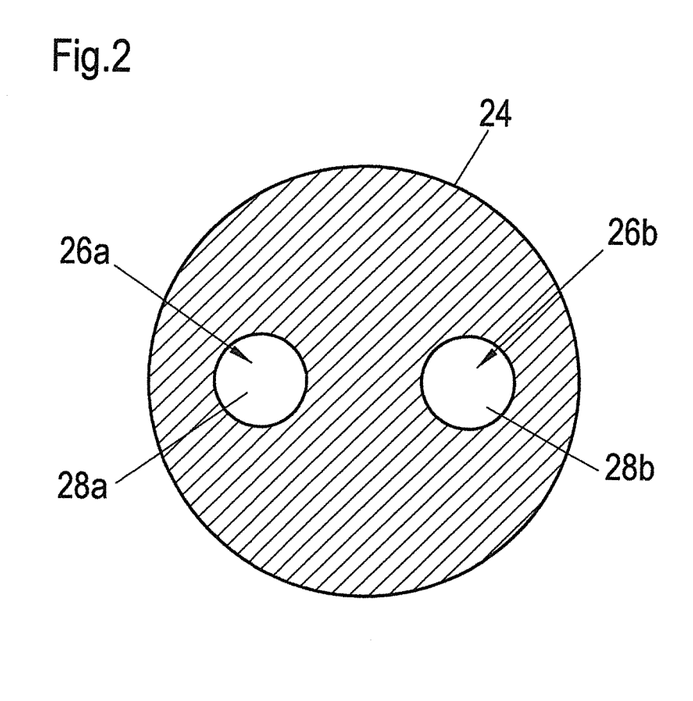
FIG. 2 shows a double aperture diaphragm of the stereoscopic microscope in accordance with FIG. 1 in a frontal view.

A fixed-position double aperture diaphragm 24 is arranged between the two lenses 20, 22 and has apertures 26a, 26b which are spaced apart from one another, which are offset from the imaging axis A and which divide the imaging optical path into respective part optical paths 28a, 28b which extend in a plane perpendicular to the plane of the drawing in FIG. 1 and therefore coincide with the optical axis O in the two-dimensional representation. The double aperture diaphragm 24 is also shown in a frontal view in FIG. 2. The part optical paths 28a, 28b differ with respect to their angles of observation of the object 12, with the part optical path 28a being able to correspond, for example, to a right perspective and the part optical path 28b being able to correspond to a left perspective.

Figure 3:
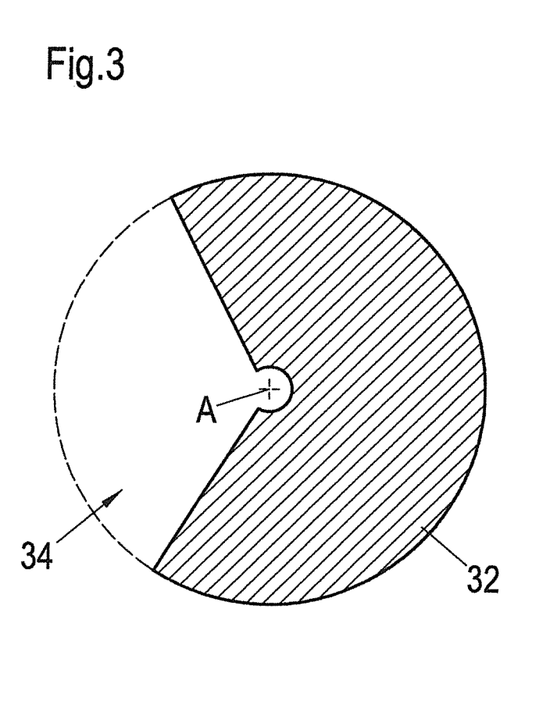
FIG. 3 shows a rotating shutter of the stereoscopic microscope in accordance with FIG. 1 in a frontal view.

A rotating shutter 32 is arranged between the double aperture diaphragm 24 and the second lens 22; it rotates about the imaging axis A. The rotating shutter 32 is driven by a drive apparatus (not shown) and has a segment opening 34 which is configured such that, in dependence on the angular position of the rotating shutter 32, the latter releases one of the two apertures 26a, 26b and closes the other one of the two apertures 26a, 26b. The rotating shutter 32 is also shown in a frontal view in FIG. 3. In the angular position shown in FIG. 3, the aperture 26a is released and the aperture 26b is closed so that only the part optical path 28a can be detected by the image sensor 16, whereas the part optical path 28b is interrupted by the rotating shutter 32.

A position sensor 36 is associated with the rotating shutter 32 and determines the angular position of the rotating shutter 32 and generates corresponding position signals.

In the second leg 18b of the L-shaped objective 18 facing the image sensor 16, a fixed-position focusing lens 66 and a further movable focusing lens 68 are provided, the latter being displaceable along a part section of the optical axis O extending in the region of the second leg 18b and called a detection axis B.

A deflection mirror 60 deflects the imaging optical path by 90° between the two legs 18a, 18b.

The camera unit 14 furthermore has a synchronization and control device 38 which is connected to the image sensor 16, to the drive apparatus and to the position sensor 36 (the connection to the position sensor is not shown). Although the synchronization and control device 38 is shown as a single unit in the present embodiment, it satisfies a plurality of functions which can also be satisfied by a plurality of separate sub-units in alternative embodiments.

The image data generated by the image sensor 16 are provided to a sensor output 42 and are transmitted to the synchronization and control device 38. The synchronization and control device 38 generates control signals for an electronic shutter of the image sensor 16 for setting the image frequency and selectively also the exposure time of the image sensor 16 which are transmitted to a corresponding sensor input 44. The synchronization and control device 38 furthermore receives the position signals generated by the position sensor 36 and transmits control signals for setting the rotational speed of the rotating shutter 32 to the drive apparatus.

The image frequency set by the electronic shutter of the image sensor 16 and the rotational speed of the rotating shutter 32 are synchronized with one another with the aid of the synchronization and control device 38 such that the image sensor 16 detects a respective stereoscopic part image on the basis of the released part optical path 28a, 28b during a time period in which one of the apertures 26a, 26b is released. The synchronization and control device 38 (or a unit separate therefrom) forms corresponding streams of pairs of stereoscopic part images from the image data detected by the image sensor 16 and finally outputs them to a data output 40 of the microscope 14.

The microscope 10 furthermore comprises an electronic viewfinder 50 which is electronically connected to the data output 40 of the microscope 14 to receive the image data. In this connection, an electronic connection is in particular understood as a cabled electrical connection, an optical connection, for example via fiber optics, or also a wireless data connection.

The synchronization and control device 38 can have further outputs to which further electronic viewfinders, other reproduction systems and/or recording systems can be connected. With the aid of the stereoscopic microscope 10 in accordance with the invention, the stereoscopic part images generated with the aid of the camera unit 14 can be duplicated without impairment of the light intensity and can be connected to any desired number of electronic viewfinders 50, to one or more recording devices and to one or more data transmission interfaces for the remote transfer of the generated image data.

The electronic viewfinder 50 has, in accordance with FIG. 1A, two electronic display devices 52a, 52b for displaying the detected stereoscopic part images (e.g. OLED displays) .—An eyepiece 54a, 54b is associated with each display device 52a, 52b, with the display device 52a being provided for reproducing the stereoscopic part images detected in accordance with the part optical path 28a and the display device 52b being provided for reproducing the stereoscopic part images detected in accordance with the part optical path 28b in the direction of a central observation axis C extending in parallel with the optical axes of the eyepieces 54a, 54b.

In accordance with a modification of the electronic viewfinder 50, the electronic viewfinder can also only comprise one single electronic display device, with the shown stereoscopic part images being directed with the aid of a beam splitting device alternatingly to one of the two eyepieces 54a, 54b, as has already been explained above.

Instead of the above-described electronic viewfinders 50, electronic viewfinders can also be alternatively or additionally provided in another embodiment. For instance, an alternative electronic viewfinder, not shown, can have a single monitor which alternatingly displays the stereoscopic part images of a respective part optical path 28a, 28b and which has to be viewed by a user with the aid of correspondingly synchronized shutter eyeglasses which alternately release one of the two eyes of the user for observing the monitor.

The electronic viewfinder 50 is rigidly coupled to the second leg 18b of the objective 18 in the embodiment of FIG. 1 and indeed such that the electronic viewfinder 50 is arranged at the rear side of the objective 18 and the observation axis C of the electronic viewfinder 50 coincides with the imaging axis A of the first leg 18a of the objective 18 in an extension.

Further variants in accordance with the invention for arranging the electronic viewfinder will be described in more detail below.

The microscope 10 in accordance with FIG. 1 furthermore has an illumination device 56 to illuminate the object 12 with visible radiation (i.e. light) and/or invisible radiation (e.g. infrared radiation or ultraviolet radiation). The illumination device 56 in accordance with FIG. 1 comprises two fiber optics 70 which are connected to a light source (not shown). Each of the two fiber optics 70 emits (in particular by means of a collimation optics not shown) an at least substantially collimated illumination beam 72. The respective illumination beam 72 extends within the respective leg of the objective 18 in parallel with the central imaging axis A, and indeed upwardly or downwardly offset thereto. Each of the two illumination beams 72 acts on a respective diverging lens 74 which expands the illumination beam 72 and deflects it through the sealing window 62 in the direction of the object 12. The two diverging lenses 74 can be arranged in a fixed position within the objective 18. Alternatively, the diverging lenses 74 can, however, also be fastened to the named carrier of the movable lens group 64 and can thus be moved together with the lens group 64.

In the microscope 10 in accordance with FIG. 1, the two lenses 20, 22 of the lens group 64 of the objective 18 comprise two recesses 76 which allow the named illumination beams 72 to pass through the lens group 64 without impinging on an optical boundary surface of the lens group 64. An unwanted incidence of scattered light caused by the illumination beams 72 into the lens group 64 is thus reliably avoided. Nevertheless, the illumination beams 72 can be conducted close to the central imaging axis A up to the diverging lenses 74 arranged close to the central imaging axis A so that an illumination of the object 12 is effected with a small cast shadow and the objective 18, including the partly integrated illumination device 56, has a compact construction (small radial extent with respect to the imaging axis A). This will be explained in more detail in the following with reference to FIG. 4.

Figure 4:
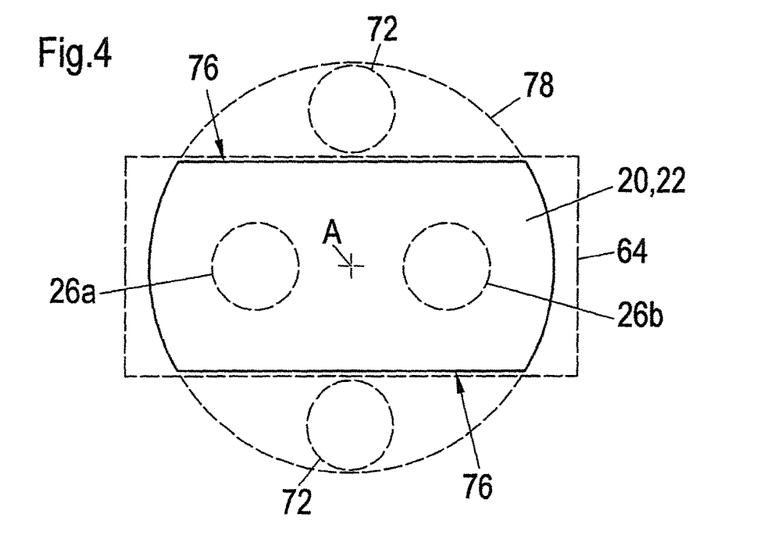
FIG. 4 shows a lens group of the stereoscopic microscope in accordance with FIG. 1 in a frontal view.

FIG. 4 shows a frontal view of the two lenses 20, 22 of the lens group 64. The lenses 20, 22 have a respective recess 76 in the form of a flattened portion at the upper side and at the lower side. In other words, the two lenses 20, 22 do not as usual have a closed circular cross-section 78 (as shown by dashed lines in FIG. 4). It is rather the case that, starting from such a circular cross-section 78, the two recesses 76 which extend in parallel with the imaging axis A along the lens group 64 are provided at two secants of the circular shape which extend in parallel with one another and horizontally in the frontal view in accordance with FIG. 5.

The lenses 20, 22 do not, however, have to be "cut-off" in a straight-line manner, as shown in FIG. 4. For example, the recesses 76 could also be formed by circular bores within a circular cross-section 78 of the lenses 20, 22. It is only important that the recesses 76 allow an unimpeded propagation of the respective illumination beam 72, even though the two illumination beams 72 extend within the objective 18.

For a better understanding, the two apertures 26a, 26b of the double aperture diaphragm 24 are also shown in FIG. 4, said double aperture diaphragm being arranged in alignment with the two lenses 20, 22 (dashed line representation without taking account of the magnification of the representation effected by the lenses 20, 22). The recesses 76 are offset both with respect to the imaging axis A and with respect to the two apertures 26a, 26b. It can thus also be seen from FIG. 4 that the recesses 76 maintain a specific minimum spacing from the apertures 26a, 26b of the double aperture diaphragm 24, with respect to an observation along the optical axis A.

Again with reference to FIG. 1, it must be pointed out that the two diverging lenses 74 are arranged at the other side of the first lens 20 with respect to the direction of propagation of the illumination beam 72. In other words, the two diverging lenses 74 are arranged, from the view of the image sensor 16, behind the last optical element (i.e. the optical element closest to the object) of the objective 18. It is hereby achieved that no light impingement on an optically effective element of the objective 18 takes place, despite the widening of the illumination beam 72, which could result in unwanted light scattering effects.

Alternatively to the explained collimated illumination beams 72, the two fiber optics 70 can also be conducted up to and in front of the respective diverging lens 74.

Further embodiments of the microscope 10 in accordance with the invention will now be described with reference to FIGS. 5 to 8, with in each case the object 12, the camera unit 14 with the first leg 18a and with the second leg 18b of the objective, the electronic viewfinder 50 and a respective adjustment apparatus 100a to 100d being shown in a schematic manner.

Figure 5:
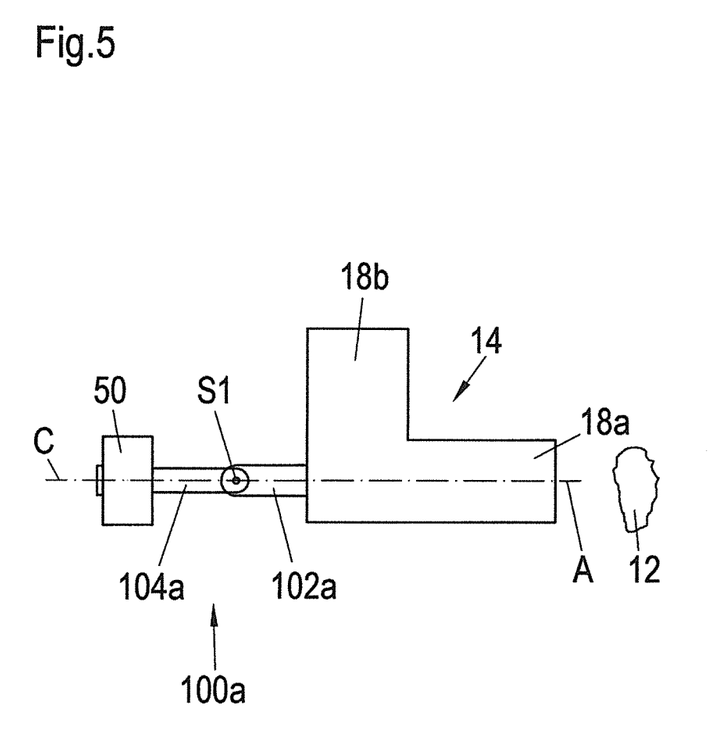
FIGS. 5 to 8 show schematic side views of a stereoscopic microscope in accordance with further embodiments.

In the embodiment in accordance with FIG. 5, the adjustment apparatus 100a comprises a support element 102a fastened to the camera unit 14 at the objective side and a support element 104a fastened to the electronic viewfinder 50 at the viewfinder side. The support elements 102a, 104a are coupled to one another pivotably about a first pivot axis S1, with the pivot axis S1 extending perpendicular to a plane which is spanned by the legs 18a, 18b and which corresponds to the plane of the drawing. The adjustment apparatus 100a is arranged such that in the adjustment position shown the observation axis C of the electronic viewfinder 50 coincides in an extension with the imaging axis A of the leg 18a.

Figure 6:
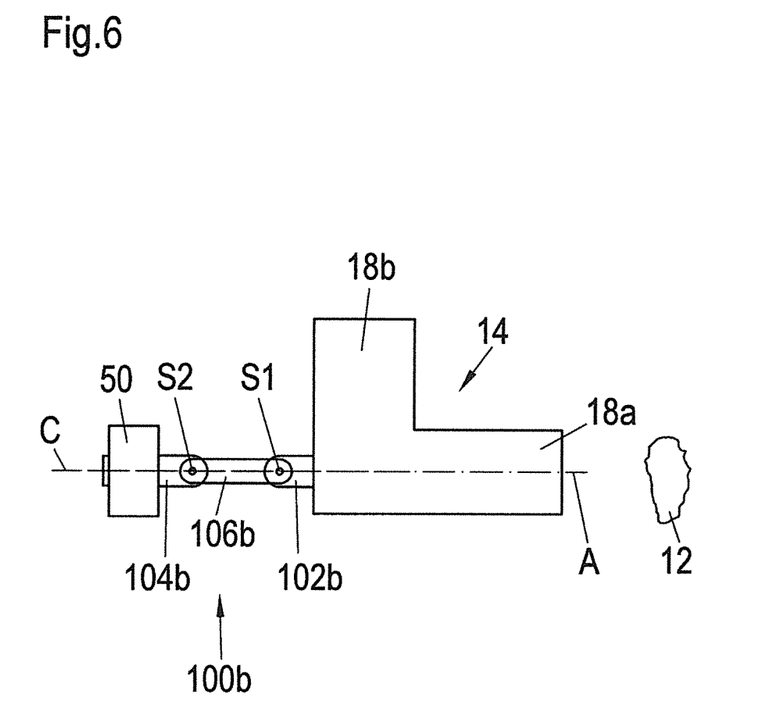

In the embodiment in accordance with FIG. 6, the adjustment apparatus 100b comprises a support element 102b fastened to the camera unit 14 at the objective side and a support element 104b fastened to the electronic viewfinder 50 at the viewfinder side. The support elements 102b, 104b are each pivotally connected to a connection element 106b, with the connection points of the support elements 102b, 104b defining with the connection element 106b a first pivot axis S1 and a second pivot axis S2 spaced apart from the first pivot axis S1, which both extend perpendicular to a plane spanned by the legs 18a, 18b. With the aid of the adjustment apparatus 100b, the electronic viewfinder 50 can be both pivoted relative to the camera unit 14 in the plane spanned by the legs 18a, 18b and displaced on an arc of a circle without changing its alignment.

Figure 7:
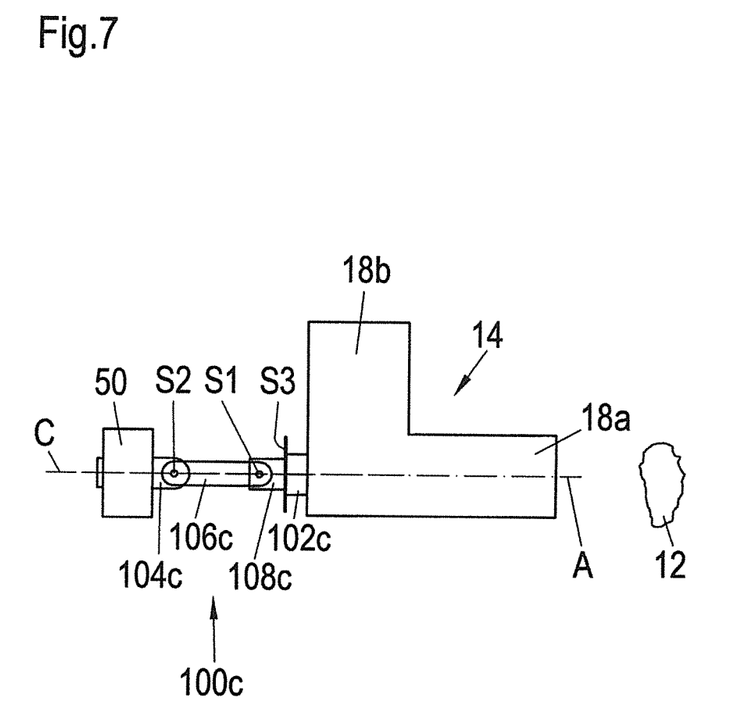

In the embodiment in accordance with FIG. 7, the adjustment apparatus 100c comprises, in a similar manner to the embodiment of FIG. 6, a support element 102c connected to the camera unit 14 at the objective side and a support element 104c connected to the electronic viewfinder 50 at the viewfinder side. An intermediate element 108c is connected pivotably about a third pivot axis S3 to the support element 102c at the objective side, with the pivot axis S3 extending in parallel with or in a plane spanned by the legs 18a, 18b. In a similar manner to the embodiment in accordance with FIG. 6, the intermediate element 108c and the support element 104c at the viewfinder side are pivotally connected to one another via a connection element 106c, with here a pivotability about a first pivot axis S1 and about a second pivot axis S2 also being present, with the pivot axes S1, S2 extending perpendicular to the plane spanned by the legs 18a, 18b and also extending perpendicular to the pivot axis S3. The adjustment apparatus 100c also allows both a pivoting (comprising a change of the angular position) of the electronic viewfinder 50 relative to the camera unit 14 in the plane spanned by the legs 18a, 18b and a displacement on an arc of a circle without changing the angular position. In addition, a pivoting is possible in a plane which extends perpendicular to the plane spanned by the legs 18a, 18b and in parallel with the imaging axis A.

Figure 8:
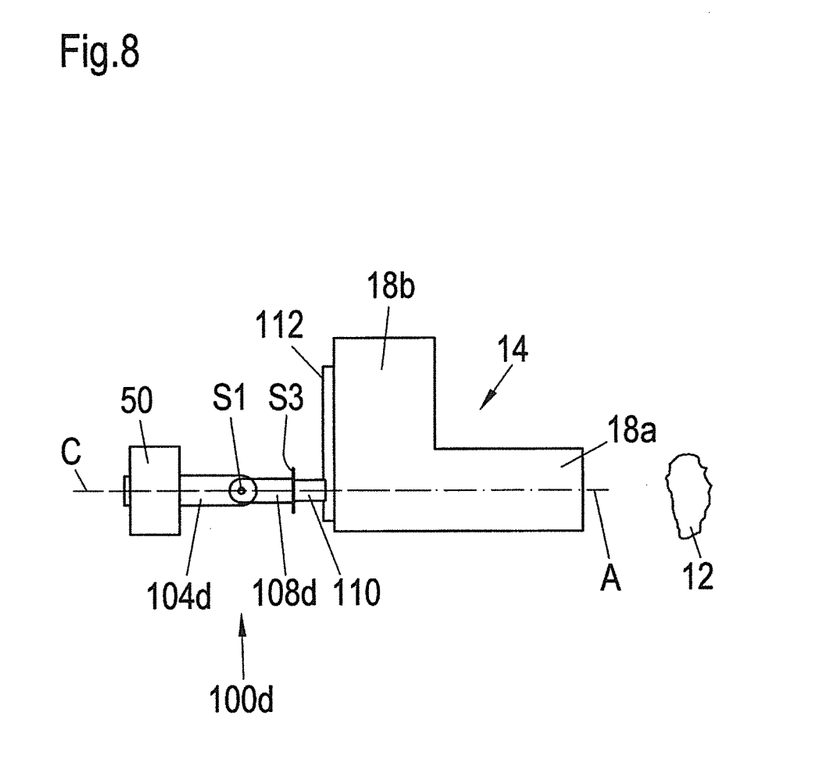

In the embodiment in accordance with FIG. 8, a guide rail 112 is arranged at the camera unit; it extends in parallel with the second leg 18b and a carriage 110 is guided at it which can be displaced in parallel with the second leg 18b.

Optionally, an intermediate element 108*d* can additionally be connected to the carriage 110 pivotably about a third pivot axis S3 extending in parallel with the second leg 18*b*. A support element 104*d* at the viewfinder side is fastened to the electronic viewfinder 50 and is connected to the intermediate element 108*d* pivotably about a first pivot axis S1. As also in the other embodiments, the pivot axis S1 extends perpendicular to a plane spanned by the two legs 18*a*, 18*b* and perpendicular to the third pivot axis S3.

The adjustment apparatus 100*d* in principle allows the same adjustment movements as the adjustment apparatus 100*c* (FIG. 7), with a purely linear adjustment of the electronic viewfinder 50 being possible with the adjustment apparatus 100*d* in the plane spanned by the legs 18*a*, 18*b* without a component orthogonal thereto.

It is understood that different aspects of the embodiments in accordance with FIGS. 5 to 8 can be combined with one another or can be omitted. For example, in the embodiment in accordance with FIG. 7, the pivotability about the second pivot axis S2 can thus be omitted in that the support element 104*c* at the viewfinder side or the electronic viewfinder 50 is rigidly connected to the intermediate element 108*c*. In the embodiment in accordance with FIG. 8, the pivotability about the third pivot axis S2 can also be omitted.

All pivot connections or linear adjustment means of the adjustment apparatus 100*a* to 100*d* can be self-locking and/or can selectively have blockable locking means.

The pivot axes S1, S2, S3 do not necessarily have to be provided at the positions shown. For example, the pivot axes provided at the support elements 104*a* to 104*d* at the viewfinder side can thus extend in a plane defined by a light outlet surface of the electronic viewfinder 50 so that on a tilting of the electronic viewfinder 50 its distance, relative to a region comprising the light outlet surface, from the imaging axis A does not change or only changes slightly.

The respective pivot axis S1 shown in FIGS. 5 to 8 can (differing from the representations) be arranged in the region of the first leg 18*a* of the objective 18, that is displaced in the direction of the object 12, for example in that a pair of pivot levers is pivotally connected to the outside of the first leg 18*a*. The electronic viewfinder 50 can hereby be arranged very close to the rear side of the objective 18.

It is ensured in all embodiments that at least one adjustment position is present in which the observation axis C coincides in an extension with the imaging axis A such that the angle of view of a user toward the electronic viewfinder 50 corresponds to that angle of view in which the objective 18 also looks at the object 12 to be imaged so that the gaze of the user is so-to-say directed directly toward the object 12.

The invention claimed is:

1. An electronic stereoscopic microscope for detecting and reproducing pairs of stereoscopic part images, comprising
    a camera unit (14) having:
        at least one electronic image sensor (16):
        a dog-leg objective (18) for generating an image of an object (12) on the image sensor (16), wherein the objective (18) comprises a first leg (18*a*) facing the object (12) to be imaged, a second leg (18*b*) facing the image sensor and a deflector (60) provided between the legs, with the second leg (18*b*) having an angle of inclination with respect to the first leg (18*a*), wherein the first leg (18*a*) extends along an imaging axis (A), the second leg (18*b*) extends along a detection axis (B) and the deflector (60) deflects an imaging optical path conducted along the imaging axis (A) completely along the detection axis (B) in the direction of the image sensor (16); and
        beam splitting means within the objective (18) which are configured to divide the imaging optical path into respective part optical paths (28*a*, 28*b*), with the part optical paths (28*a*, 28*b*) differing with respect to their observation angle of the object (12);
    and further comprising
    an electronic viewfinder (50) for reproducing stereoscopic part images detected by means of the image sensor (16), and
    an adjustment apparatus (100*a*-100*d*) which movably connects the electronic viewfinder (50) to a rear side of the objective (18);
    wherein the adjustment apparatus (100*a*-100*d*) is configured to move the electronic viewfinder (50) into an observation position which is provided at the rear side of the objective (18) closely adjacent to a rear side of the deflector (60) in an extension of the imaging axis (A) of the first leg (18*a*) of the objective (18), the electronic viewfinder (50) in the observation position being separated from the rear side of the deflector (60) only by the adjustment apparatus (100*a*-100*d*).

2. The microscope in accordance with claim 1,
    wherein the adjustment apparatus (100*d*) is configured to displace the electronic viewfinder (50) along a direction of movement or with a movement component in parallel with the second leg (18*b*) of the objective (18).

3. The microscope in accordance with claim 1,
    wherein the adjustment apparatus (100*a*-100*d*) is configured to pivot the electronic viewfinder (50) about at least one pivot axis (S1, S2, S3).

4. The microscope in accordance with claim 3,
    wherein the pivot axis (S1, S2) extends perpendicular to a plane which is spanned by the first and the second legs (18*a*, 18*b*) of the objective (18).

5. The microscope in accordance with claim 3,
    wherein the pivot axis (S1, S2, S3) intersects the imaging axis (A) of the first leg (18*a*) of the objective (18) or the extension of the imaging axis (A).

6. The microscope in accordance with claim 3,
    wherein a light outlet region of the electronic viewfinder (50) coincides with or is spaced apart from the pivot axis (S1, S2, S3).

7. The microscope in accordance with claim 1, wherein the adjustment apparatus (100*a*-100*d*) is fastened to the second leg (18*b*) of the objective (18).

8. The microscope in accordance with claim 1,
    wherein the angle of inclination amounts to 90°.

9. The microscope in accordance with claim 1,
    wherein the second leg (18*b*) of the objective (18) is aligned such that the detection axis (B) extends perpendicular to a plane which is spanned by the optical axes of the two part optical paths (28*a*, 28*b*) extending within the first leg (18*a*).

10. The microscope in accordance with claim 1,
    wherein the objective (18) has a single imaging optical path with a central optical axis (O);
    wherein the camera unit (14) furthermore only comprises a single electronic image sensor (16);
    wherein the beam splitting means comprise:
        a double aperture diaphragm (24) which is arranged in the imaging optical path and which has two apertures (26*a*, 26*b*) which are spaced apart from one another, which are offset from the optical axis (A) and which divide the imaging optical path into the respective part optical paths (28*a*, 28*b*);

a rotating shutter (32) which is associated with the double aperture diaphragm (24), which releases one of the two apertures (26a, 26b) for a predefined time period in accordance with a speed of rotation alternating in time and which closes the other of the two apertures (26a, 26b) at least during this time period in order to release one of the two part optical paths (28a, 28b) alternating in time and to interrupt the other one of the two part optical paths (28a, 28b); and a synchronization and control device (38) which is adapted to synchronize the reading out of the image sensor (16) and the speed of rotation of the rotating shutter (32) with one another such that the image sensor (16) detects a respective stereoscopic part image on the basis of the released part optical path (28a, 28b) during the named time period.

11. The microscope in accordance with claim 10, wherein the image sensor has an electronic shutter for setting a charge integration time of the image sensor (16); and wherein the synchronization and control device (38) is adapted to synchronize the charge integration time set by the electronic shutter of the image sensor (16) and the speed of rotation of the rotating shutter (32) with one another.

12. The microscope in accordance with claim 1, wherein the electronic viewfinder (50) has at least one electronic display device (52a, 52b) and two eyepieces (54a, 54b).

13. The microscope in accordance with claim 1, wherein the adjustment apparatus (100d) is configured to move the electronic viewfinder (50) along a direction in parallel with the second leg (18b) of the objective (18), wherein the adjustment apparatus (100d) comprises a guide rail (112) which is arranged at the second leg (18b) of the objective (18) and a carriage (110) which is guided at the guide rail (112) and which is connected to the electronic viewfinder (50).

* * * * *